United States Patent
Bui et al.

(10) Patent No.: US 6,532,128 B1
(45) Date of Patent: Mar. 11, 2003

(54) DATA SET TO RECORDING MEDIA REGISTRATION AND SYNCHRONIZATION

(75) Inventors: Nhan Xuan Bui, Tucson, AZ (US); Glen Alan Jaquette, Tucson, AZ (US); John Alexander Koski, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,073

(22) Filed: May 19, 1999

(51) Int. Cl.$^7$ ............................................. G11B 15/48
(52) U.S. Cl. ...................................... 360/74.1; 360/72.2
(58) Field of Search ................................ 360/72.2, 72.3, 360/77.12, 74.1, 74.2, 74.4, 72.1, 27, 13, 49; 386/46

(56) References Cited

U.S. PATENT DOCUMENTS

| | | | |
|---|---|---|---|
| 3,714,382 A | 1/1973 | Sykes | 179/100.2 |
| 4,296,491 A | 10/1981 | Jerome | 369/59 |
| 4,321,632 A | 3/1982 | Leis et al. | 360/49 |
| 4,703,311 A | 10/1987 | Roggendorf | 340/347 |
| 4,737,868 A * | 4/1988 | Kimura et al. | 360/74.4 |
| 4,752,846 A * | 6/1988 | Proeho | 360/72.2 |
| 5,325,370 A | 6/1994 | Cleveland et al. | 371/37.4 |
| 5,341,356 A | 8/1994 | Dieleman et al. | 369/47 |
| 5,689,384 A | 11/1997 | Albrecht et al. | 360/77.12 |
| 5,930,065 A * | 7/1999 | Albrecht et al. | 360/72.2 |
| 5,999,688 A * | 12/1999 | Iffulden et al. | 386/46 |
| 6,014,276 A * | 1/2000 | Takase | 360/49 |

* cited by examiner

*Primary Examiner*—David Hudspeth
*Assistant Examiner*—Mitchell Slavitt
(74) *Attorney, Agent, or Firm*—John H. Holcombe; Jean M. Barkley (57) ABSTRACT

A system and method for precisely registering and synchronizing data sets on a recording media having a prerecorded servo pattern. The recording media is subject to continuing movement for reading and/or writing the data sets, interrupted by stopping at the end of a selected data set and restarting. During the continuing movement of the recording media, a detector coupled to the servo system continuously reads linear position registration data modulated into the prerecorded servo pattern. An interpolator interpolates the prerecorded registration data to provide precision registration information for the data sets. Upon the drive stopping the recording media, then back hitching the media and the movement restarting, selected read and interpolated registration information is provided. The detector again reads and interpolates the prerecorded registration data, and a comparator compares the again read and interpolated registration information to the provided read and interpolated registration information and any predetermined offset, and indicates a comparison match. A data formatter coupled to the comparator, responsive to the comparison match indication, synchronizes the reading and/or writing of data sets on the recording media.

22 Claims, 7 Drawing Sheets

| DATA SET IDENTIFIERS | | LINEAR POSITION INFORMATION | | |
|---|---|---|---|---|
| CODE WORD PAIR HEADER ID | STATUS | DETECTED LPOS | INTERPOLATED COUNT | STATUS |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |
| ☐☐☐☐☐☐☐☐ | ☐☐☐☐ | ☐☐☐☐☐☐ | ☐☐☐☐☐☐☐ | ☐☐☐☐ |

FIG. 15

DATA SET TO RECORDING MEDIA REGISTRATION AND SYNCHRONIZATION

DOCUMENTS INCORPORATED BY REFERENCE

Commonly assigned U.S. Pat. No. 5,930,065, issued Jul. 27, 1999, (application Ser. No. 08/859,830), Albrecht et al., is incorporated for its showing of a magnetic tape media having data information superimposed on prerecorded track following servo information.

TECHNICAL FIELD

This invention relates to the recording of data on a high speed moving recording media which is subject to stoppage, such as a tape, and, more particularly, to the correlation of data processing data sets to the media position and resynchronizing the media position to the data set sequence upon restart of the media movement.

BACKGROUND OF THE INVENTION

Typically, longitudinal media, such as magnetic tape or optical tape, is employed in data processing systems as a secondary storage media for storing large amounts of data for low cost, infrequently used data or for archival purposes. Often, the data (in the form of a series of data sets) is transferred to the longitudinal media for writing on the media by streaming. Similarly, the data is often read on a continuous basis. The data transfer is, however, subject to interruption or to a temporary fault condition while the media continues to move at its continuous nominal velocity. Thus, the media must be stopped, and later restarted.

On restart, the media position must be correlated and resynchronized with respect to the data set sequence. A typical prior art tape drive which moves the tape media is equipped with an incremental encoder, or tachometer, which provides a precise positioning signal to counters which monitor media position. The tape drive may then reposition the tape media backwards, also known as a back hitch, a certain amount based on the incremental encoder positioning signal and restart the tape so that the tape is up to speed by the time it reaches the point at which the data transfer ended. If the tape did not slip, the incremental encoder or tachometer, and counters should identify the point at which the data transfer ended, and the data transfer is resumed.

Cost reduction is of key importance in modern tape drives and other longitudinal media drives. Precision incremental encoders are expensive and it is desirable to provide an alternative, which may allow the elimination of the incremental encoder.

Special indexing or clocking tracks have been employed, but modern data processing tape drives maximize the number of data tracks on the tape media. Thus, elimination of any non-data special indexing or clocking tracks is essential.

SUMMARY OF THE INVENTION

An object of the present invention is to identify the point at which the data transfer ended, and resume the data transfer without requiring an incremental encoder.

Disclosed are system and method for precisely registering and synchronizing data sets on a recording media, the recording media having a prerecorded servo pattern. The drive has a servo system for reading the prerecorded servo pattern on the recording media. The recording media is subject to continuing movement for reading and/or writing the data sets, interrupted by stopping at the end of a selected data set and restarting.

In the present method, during the continuing movement of the recording media while reading and/or writing data sets on the recording media, a detector coupled to the servo system continuously reads linear position registration data modulated or superimposed in the prerecorded servo pattern on the recording media. An interpolator interpolates the prerecorded linear position registration data to provide precision registration information for the data sets. Upon the stopping of the recording media, the recording media is back hitched in the opposite direction, and the movement is restarted by the drive. Upon the back hitch and restart, selected read and interpolated registration information is provided. The detector again reads and interpolates the prerecorded registration data (defined as the "again read data and interpolated" data), and a comparator compares the again read and interpolated registration information to the provided read and interpolated registration information, and indicates a comparison match. A data formatter coupled to the comparator, responsive to the comparison match indication, synchronizes the reading and/or writing data sets on the recording media.

In another aspect of the present invention, a magnetic tape media having prerecorded interpolatable linear position registration data information recorded in magnetic flux transition servo patterns defining at least one longitudinal servo track is provided with a plurality of frames of alternating groups of burst patterns. Each group of burst patterns has alternating numbers of at least two repeated pairs of non-parallel magnetic flux track following servo transitions. At least two of the transitions of the repeated pairs are shifted longitudinally with respect to other of the transitions of the repeated pairs. The shifted transitions comprise registration data information, and each frame or group comprises interpolation information.

An advantage of the present invention is that the registration information is provided directly on the media, so that no reliance is placed on preventing slip between the media and the incremental encoder.

For a fuller understanding of the present invention, reference should be made to the following detailed description taken in conjunction with the accompanying drawings.

BRIEF DESCRIPTION OF THE DRAWINGS

FIGS. 7 and 8 are respectively representations of an uncoded "4,5" stripe servo pattern and a combined "4,5"

stripe servo pattern and encoded data pattern which may be implemented in accordance with a preferred embodiment of the present invention;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
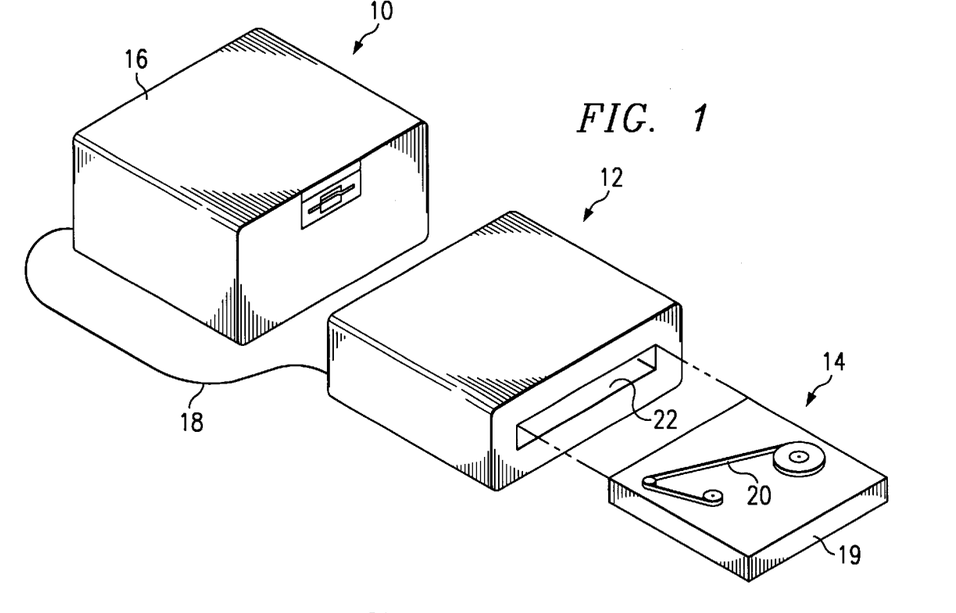
FIG. 1 is a perspective view representation of a host system, and of a tape drive data storage device and associated tape cartridge in accordance with an embodiment of the present invention.
Figure 2:
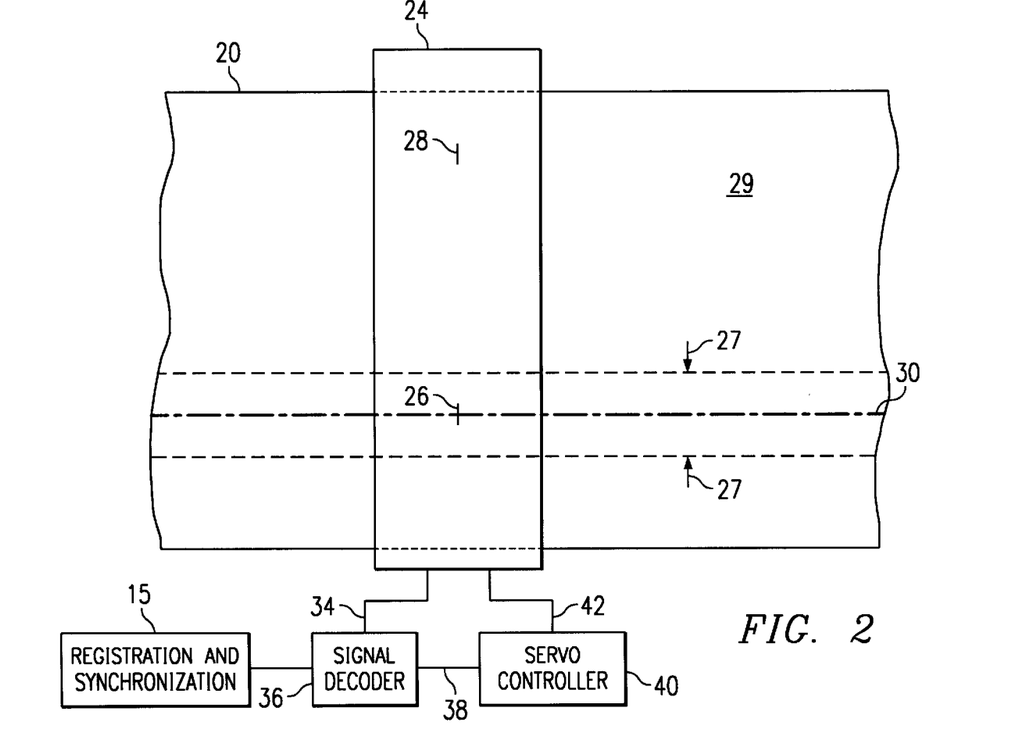
FIG. 2 is a schematic representation of a tape drive data storage device with a registration and synchronization system and associated tape cartridge showing one servo track in accordance with an embodiment of the present invention.

Referring to FIGS. 1 and 2, a data storage system is illustrated including tape drive data storage device 12, such as a magnetic tape drive, and associated tape cartridge 14, with a data set to tape media registration and synchronization system 15 in accordance with the present invention. Referring to FIG. 1, the tape drive 12 accepts tape cartridge 14, which stores data in the form of data sets to be read and/or written by the tape drive 12, and is connected to a host data processor 16 by a cable 18. The tape cartridge 14 comprises a housing 19 containing a length of tape 20, such as magnetic tape. Alternatively, the tape drive 12 may comprise an optical tape drive, and tape cartridge 14 may comprise an optical media. The tape drive 12 includes a receiving slot 22 into which the cartridge 14 is inserted. The host data processor 16 can comprise any suitable processor, for example, a personal computer such as the IBM "Aptiva", or can be a workstation such as the IBM "RS6000", or can be a systems computer, such as the IBM "AS400". The tape drive 12 is preferably compatible with the associated host processors and can assume any one of a variety of cartridge or cassette linear formats. Examples of such tape drives include the IBM "3490" tape drive units, or the IBM "3570" tape drive units, or "Digital Linear Tape", or "Travan" compatible tape drives, some of which employ two reel cartridges 14 and others employ single reel cartridges.

Referring to FIG. 2, such tape drives typically include drive motors (not shown) for rotating the reels of the cartridge 14 to move the tape 20 across a head assembly 24. The head assembly is shown in solid lines and includes a relatively narrow servo read head 26 that detects a servo pattern recorded in a servo track 27 of the tape. A data head 28 of the head assembly is typically larger than the servo head and is positioned over a data track region 29 of the tape containing multiple data tracks for reading data recorded in a data track, or for writing data in a data track. FIG. 2 shows a single servo read head and a single data head for simplicity of illustration. Those skilled in the art will appreciate that most data processing tape systems have multiple parallel servo tracks, multiple servo read heads, and multiple data read and write heads.

The servo track centerline 30 is indicated as extending along the length of the tape 20. The servo read head 26 is relatively narrow and has a width substantially less than the width of the servo track 27. In accordance with the incorporated Albrecht et al. application, the tape is moved longitudinally across the tape head assembly 24 so that the servo track 27 is moved across the servo head 26. When such movement occurs, the servo pattern of magnetic flux transitions is detected by the servo read head 26 so that it generates an analog servo read head signal that is provided via a servo signal line 34 to a signal decoder 36. The signal decoder processes the servo read head signal and generates a position signal that is transmitted via position signal lines 38 to a servo controller 40. The servo controller generates a servo control signal and provides it on control lines 42 to a servo positioning mechanism at head assembly 24. The servo positioning mechanism responds to the control signal from the servo controller by moving the assembly including servo head 26 laterally with respect to the servo track centerline 30 to reach the desired servo track or to maintain the servo head 26 centered with respect to the servo track centerline 30.

As discussed above, the data is typically transferred to or from the tape media by streaming. The data transfer is, however, often subject to interruption while the media continues to move at its continuous nominal velocity. Thus, the media must be stopped, and later restarted.

On restart, the media position must be correlated and resynchronized with respect to the data set sequence. This is especially important on a write, since it might overwrite a previous data set, or may leave an old data set mixed in with the new data. The tape drive 12 repositions the tape media backwards by back hitching, which comprises operating the drive motor in the reverse direction for a defined period of time. The back hitch is therefore of an approximate linear distance, and the tape motion is restarted so that the tape is up to speed by the time it reaches the point at which the data transfer ended. The present invention synchronizes the data sets to the linear position of the tape for restarting the data transfer. Thus, the data transfer begins at the "identical" point at which it was stopped. Herein, the term "identical" is defined to include any required offset, such as to accommodate read to write head offset, or to accommodate a write append operation.

The incorporated Albrecht et al. patent discloses a magnetic tape media having data information superimposed on prerecorded track following servo information by modulating the encoded data into the servo. The servo information is recorded in magnetic flux transition patterns defining at least one longitudinal servo track. A servo burst pattern of at least two repeated pairs of non-parallel magnetic flux transitions is provided, which are slanted or otherwise continuously longitudinally variable in different directions across the width of the servo track. In one example, the transitions are each oppositely facing chevrons, each pair of transitions thereby forming a "diamond". In another example, oppositely sloped stripes are employed. The pairs of transitions are formed into groups of multiple pairs of transitions. At least two transitions of the repeated pairs in a group are shifted longitudinally with respect to other of the transitions, the shifted transitions comprising the modulated data information.

Data information of the type proposed by Albrecht et al., is employed, in accordance with the present invention, to provide prerecorded interpolatable linear position registration data in servo patterns defining at least one longitudinal servo track.

Figure 3:
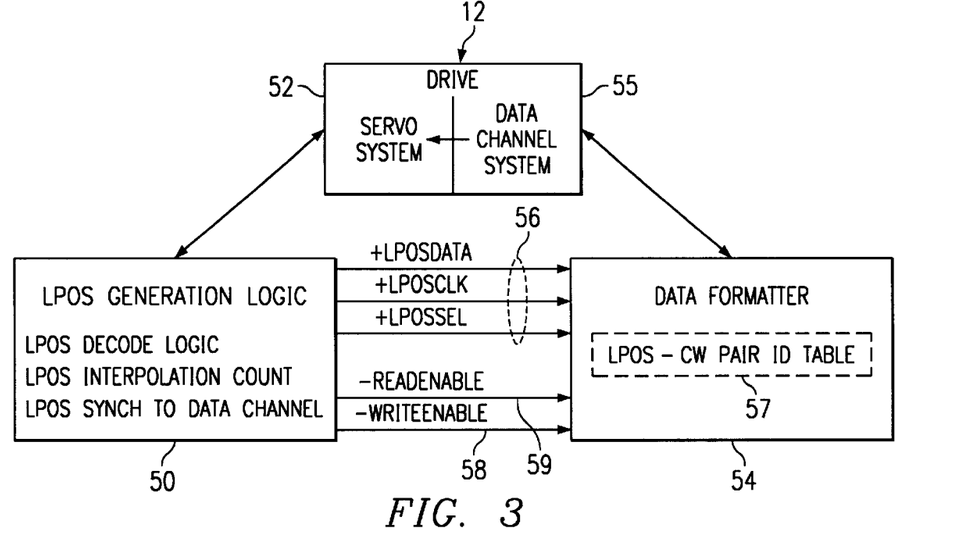
FIG. 3 is a block diagram of a tape drive data storage device and registration and synchronization system of FIGS. 1 and 2.

FIG. 3 illustrates one embodiment of the registration and synchronization system, of the present invention. Referring to FIG. 3, the servo system 52 provides and decodes the servo track and prerecorded data. The linear position (LPOS) generation logic 50 detects the prerecorded linear position registration data from the decoded servo track. pattern. The linear position registration data is encoded into the servo track over a length of tape sufficient to provide a large number of bits of registration data so that, preferably, the registration data may be recorded as sequential counts which are incremented and will not be repeated in the entire length of tape. As the result, a total linear position registration data word may require a length of tape longer than the desired resolution.

Therefore, the linear position generation logic 50 additionally interpolates the linear position registration data so as to provide greater resolution of the linear position of the recording media or tape.

The linear position generation logic 50 continuously reads and interpolates the linear position registration data modulated into the prerecorded servo pattern on the recording media, and supplies the read and interpolated position information (LPOS) to a data formatter 54. In the illustrated embodiment of FIG. 3, the information is supplied over a serial interface 56.

In the data formatter 54, the read data flow of the read/write channel of the drive 12 decodes a set of unique characters recorded with each data set called the "Code Word Pair Header ID". The data formatter provides a hardware memory buffer and builds a table 57 of the relevant part of the most recent Code Word Pair Header ID's vs. LPOS. When a data set separator is detected, a new entry is made in the table 57, which, if the table is full, overwrites the oldest entry in the table. Alternatively, the table is implemented as a FIFO with the most recent entry pushed on. If the FIFO is full, this results in the oldest entry being pushed off.

At some point, the recording media may be stopped. The stoppage may be due to an interruption in the data transfer or to a temporary fault condition, as discussed above. Alternatively, the data transfer may be complete. Thus, the media, instead of restarting, may be rewound and removed from the drive 12.

If the data transfer was interrupted the recording media must be back hitched in the opposite direction and later restarted. The drive 12 accelerates the recording media up to the correct speed to allow the servo system to laterally align the tape head with respect to the data track.

To attain longitudinal alignment of the data set, the tape drive 12 back hitches the recording media and restarts the movement of the media, so as to correlate and resynchronize the media position of data set with respect to the data set sequence.

Alternatively, the tape controller may command that the data transfer begin at an earlier data set in the sequence.

The read and interpolated linear position registration information of the most recent data set, derived from the LPOS to data set entries of table 57, or the table entry LPOS information for the earlier data set, is thus provided to the linear position generation logic 50. As an example, the data formatter 54 provides the selected read and interpolated linear position registration information to a data channel system 55, which indicates the completion of the back hitch and restart process and provides the selected read and interpolated linear position registration information to the linear position generation logic 50. The linear position generation logic 50 again reads and interpolates the prerecorded linear position registration data and compares the again read and interpolated linear position registration information to the provided read and interpolated linear position registration information. Upon the provided and again read linear position registration information matching, the identical linear position of the recording media has been reached, or a predetermined offset reached, such as in a write append, or to accommodate read to write head offset, as discussed above. The linear position generation logic indicates a comparison match, comprising a write enable signal on line 58 or read enable signal on line 59 to the data formatter 54. The data formatter 54 then, in response to the comparison match indication, initiates a read operation or a write append operation, synchronizing the reading and/or writing of data sets on the recording media.

The data sets are typically separated by data set separators, and the data formatter 54 synchronizes the reading and/or writing at the data set separator immediately following the data set at the matched linear position registration data.

Figure 4:
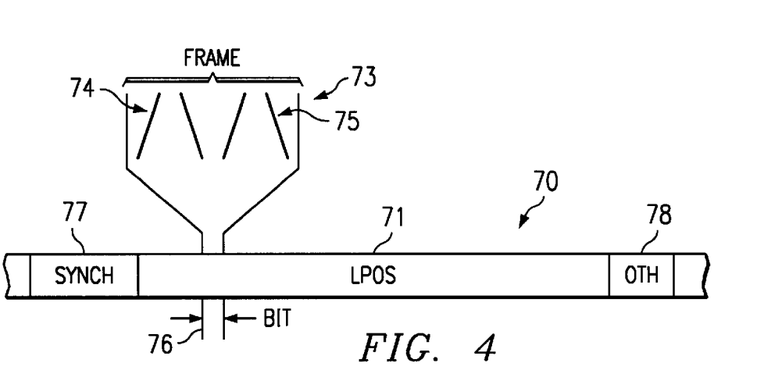
FIG. 4 is a schematic representation of an embodiment of magnetic tape media having prerecorded interpolatable linear position registration data information recorded in magnetic flux transition stripe servo patterns defining at least one longitudinal servo track in accordance with the present invention.

FIG. 4 illustrates a recording media 70, such as a magnetic tape media, having prerecorded interpolatable linear position registration data information 71 recorded, for example, in magnetic flux transition servo patterns, defining at least one longitudinal servo track. The data of the servo track comprises a plurality of frames 73 of alternating groups of burst patterns 74 and 75.

In accordance with one embodiment of the present invention, one bit 76 of linear position registration data 71 is provided in each frame. The data in the servo track preferably includes a synchronization character 77 followed by the longitudinal position data 71, and may be followed by other data 78, such as data supplied by the media manufacturer. As an example, the synchronization character may comprise an 8 bit character, such as a "1" bit followed by 7 "0" bits. The synchronization character provides a means of identifying the beginning of each set of linear position registration data.

As discussed above, the linear position registration data 71 is encoded into the servo track over a length of tape sufficient to provide a large number of bits of registration data so that, preferably, the registration data may be recorded as sequential data which will not be repeated in the entire length of tape. The servo tracks containing the linear position registration data may be recorded into the recording media at a stage prior to cutting the recording media into individual media. As the result, the linear position registration data may not begin at a low number in the total sequence, but rather may begin at any number in the total sequence.

Because of the large number of bits, such as 24 bits, a total linear position registration data word 71 and accompanying synchronization character 77 (e.g., 8 bits) and other data 78 (e.g., 4 bits) may require a length of tape longer than the desired resolution.

Therefore, in accordance with the present invention, the recorded data is interpolatable, with each group of data comprising interpolation information. In accordance with one embodiment of the invention, each frame 73 comprises two groups of patterns 74 and 75, and each half frame group is counted from the end of each synchronization pattern 77 and the beginning of the linear position registration data 71, thereby providing an interpolation of. The linear position registration data. As a specific example, if the total linear position registration data pattern comprises an 8 bit synchronization character 77, a 24 bit linear position registration data word 71, and 4 bits of other data, for a total of 36 bits 76 and 36 frames 73, and counting by half frames, each bit count of. interpolation information represents 1/72 of the total pattern. As an alternative, each frame may instead be counted, providing a 1/36 interpolation.

In accordance with the Albrecht et al. patent, FIGS. 5–8 illustrate examples of servo patterns in which data may be encoded.

Figure 5:
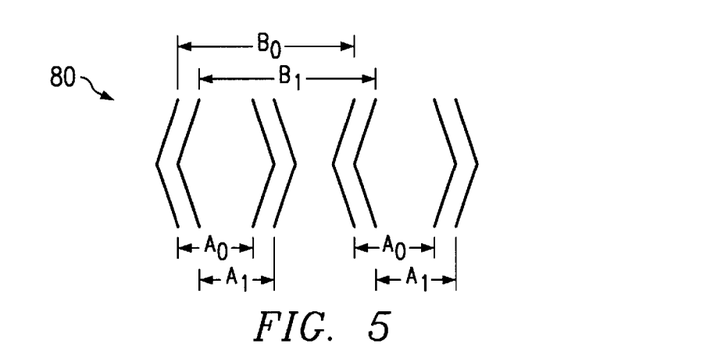
FIGS. 5 and 6 are respectively representations of an uncoded diamond servo pattern and a combined servo and encoded data. pattern which may be implemented in accordance with an embodiment of the present invention.
Figure 6:
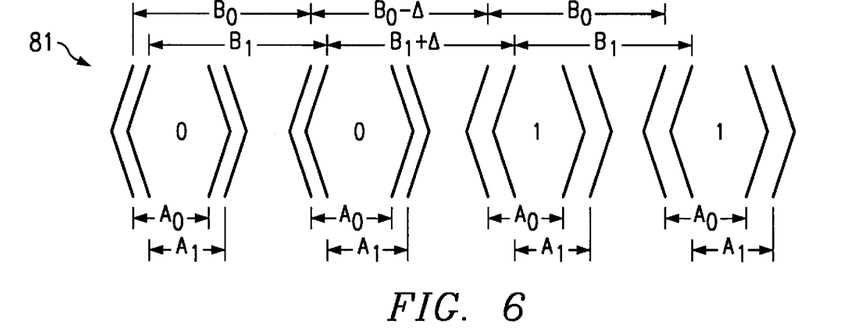

FIGS. 5 and 6 illustrate the simplest method for encoding data into the servo pattern. The illustrated pattern comprises transitions which each vary in two longitudinal directions across the recording media, called "chevrons". A pair of facing chevrons are in opposed directions, and are called a "diamond." Alternatively, the transitions may comprise only the top halves of the chevrons and a pair of transitions thus comprise, first, a forwardly sloped transition, or "stripe", followed by a reverse sloped transition, or stripe. As a further alternative, one of the transitions may have no slope. Hereinafter, "chevron" or "stripe" refers to a single transition and "diamond" or "stripe pair" refers to a matched pair of non-parallel facing transitions.

The minimum number of chevrons in a group that can be used to generate a servo position error signal and to encode data is two. An exemplary encoding algorithm is to encode a "1" by moving the chevrons apart and to encode a "0" by moving the chevrons closer together. The distance each chevron is moved is identical in magnitude but opposite in direction. Since the chevrons must be moved in pairs, both of the chevrons comprising a diamond are moved together as a pair. In FIG. 5, the four chevron, pattern of two diamonds 80 represents the normal spacing of the chevrons without data, and, in FIG. 6, the patterns of diamonds 81 are shown as encoding the bits "0 0 1 1", reading from left to right. Specifically, the "A" distances represent the servo information, and the "B" distances represent the encoded data.

Although the two diamond pattern of FIG. 6 may be used to implement the present invention, a major disadvantage with only two diamonds per group is that it is difficult to distinguish a "00000" pattern from a "11111" pattern without the drive speed being constant and known. Velocity independent designs are difficult with only two diamonds per group.

Figure 7:
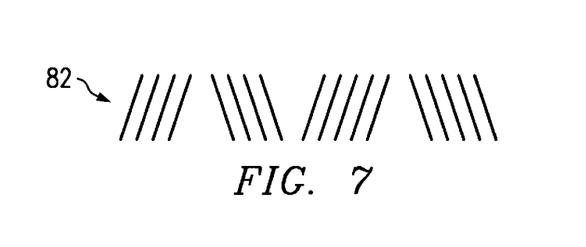
Figure 8:
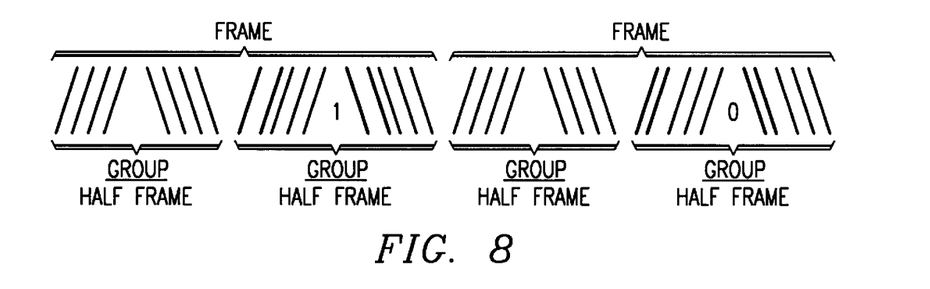

However, as discussed in the Albrecht et al. patent, velocity independent designs are possible if three or more diamonds or stripe pairs are used per group, as illustrated in FIGS. 7 and 8. FIG. 7 comprises alternating groups 82 of four stripe pairs and of five stripe pairs at a normal spacing. FIG. 8 illustrates groups 83 of the alternating four and five stripe pair bursts of FIG. 7, moving two of the stripes in each side of the five stripe pair group apart to encode a "1" and moving the stripes closer together to encode a "0".

As an alternative, both the four and the five stripe pair bursts may be encoded.

Encoded stripe pairs for providing information is additionally disclosed and employed in the "Linear Tape Open" or "LTO" standard pattern.

Thus, with a magnetic tape recording media, each group of burst patterns comprises alternating numbers of at least two repeated pairs of non-parallel magnetic flux track following servo transitions, where at least one of the transitions of each pair is continuously longitudinally variable across the width of the track, such as a stripe or chevron. At least two of the transitions of the repeated pairs of a group in each frame are shifted longitudinally with respect to other of the transitions of the repeated pairs. The shifted transitions comprise linear position registration data, and each group of burst patterns, such as a diamond, or a frame of two alternate length diamonds comprises interpolation information.

As a specific example, referring to FIGS. 4 and 8, each frame 73 may comprise a length of 200 microns, and each group or half frame a length of approximately 100 microns. If the total length of the LPOS data 71 were 36 bits comprising 36 frames, the total length of the LPOS data is 7.2 mm. The input to the LPOS data is updated as each frame is read, but the data only represents its position covering its full length of 7.2 mm. The interpolation within the LPOS data provided by the use of each group for interpolation is thus 1/72, or to within 100 microns.

Figure 9:
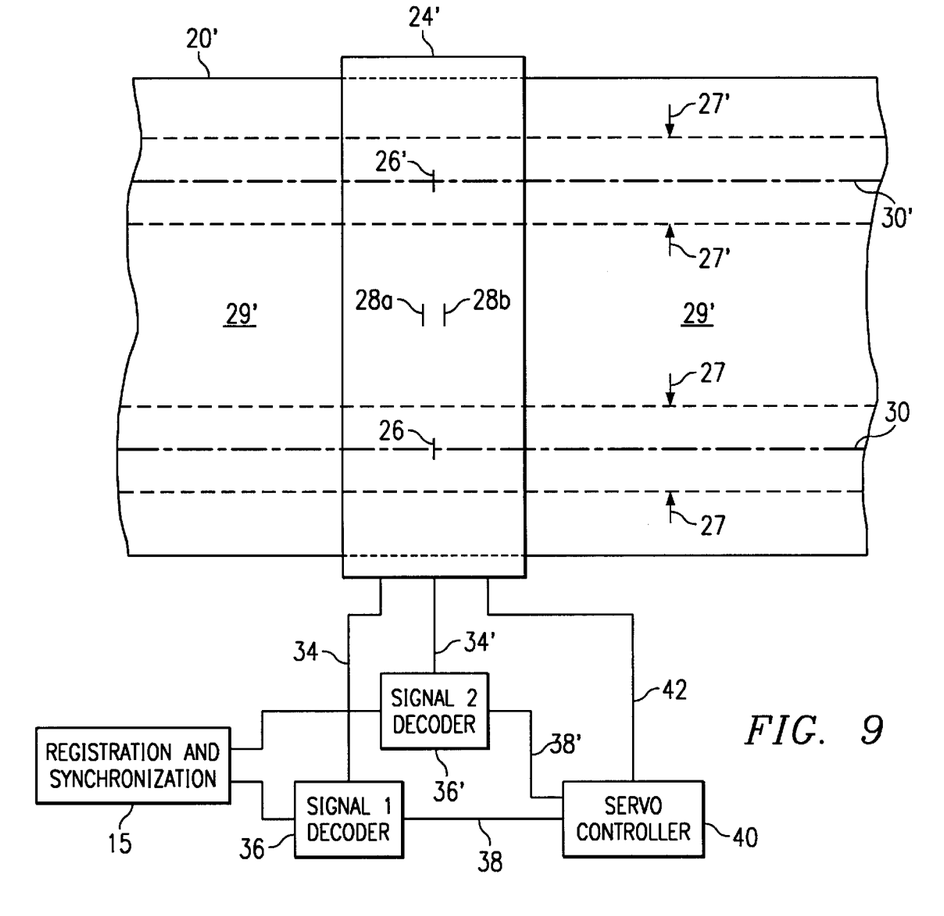
FIG. 9 is a schematic representation of a tape drive data storage device with a registration and synchronization system and associated tape cartridge showing two servo tracks in accordance with an embodiment of the present invention.

FIG. 9 illustrates a duplicate servo and modulated data system, having duplicate servo tracks 27 and 27', read by servo read heads 26 and 26' of head assembly 24'. The servo tracks are read simultaneously and provide a more accurate positioning of data head 28a and 28b by servoing the servo heads over both servo track centerlines 30 and 30', whose average or combined position is more accurate than that of a single head. Signal decoder 36' may be identical to that of signal decoder 36 and employ the identical modulated data decoding arrangement.

In accordance with the present invention, the identical linear position registration data is prerecorded in each of the duplicate servo tracks 27 and 27'. Thus, should an error occur in one of the servo tracks, or should an error occur in reading one of the servo tracks, a registration and synchronization system 15 will switch from the error servo track to the other servo track.

Figure 10:
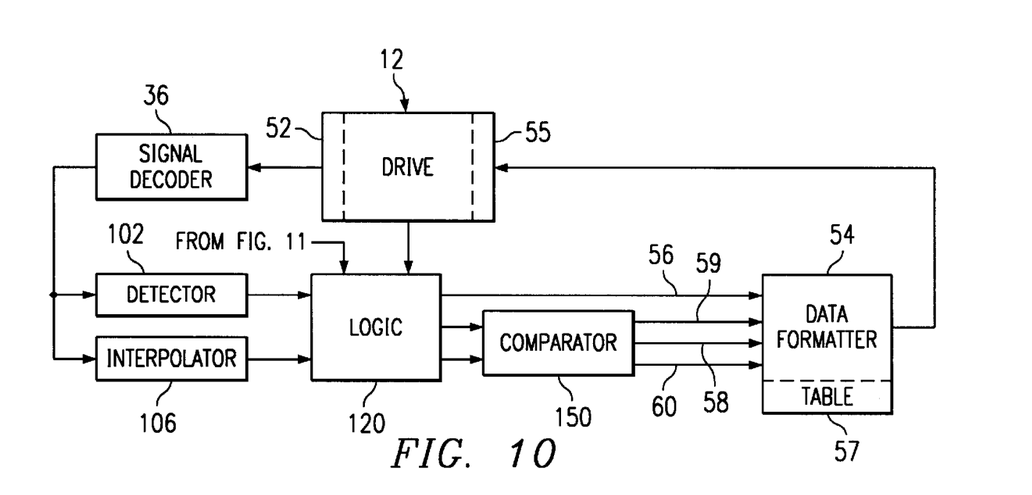
FIG. 10 is a more detailed block diagram of an embodiment of a tape drive data storage device and registration and synchronization system of FIG. 3 for implementation with the one servo track of FIG. 2.
Figure 11:
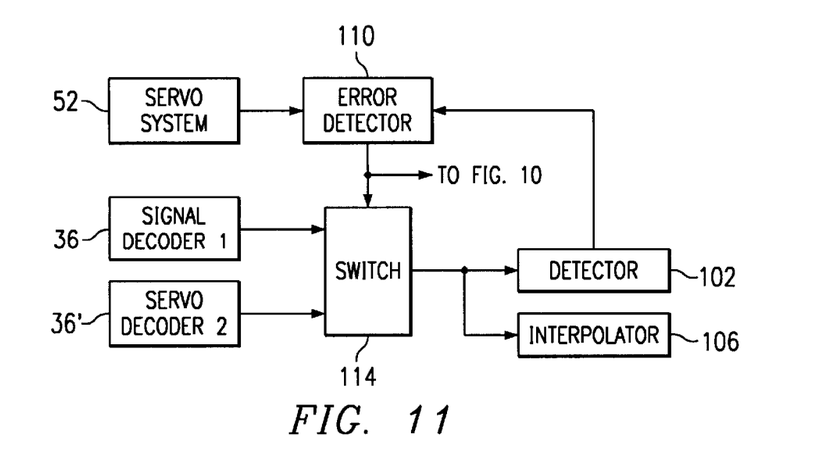
FIG. 11 is a block diagram of an embodiment of error detection structure to be applied to the system of FIG. 10 for implementation with the two servo tracks of FIG. 9.
Figure 12:
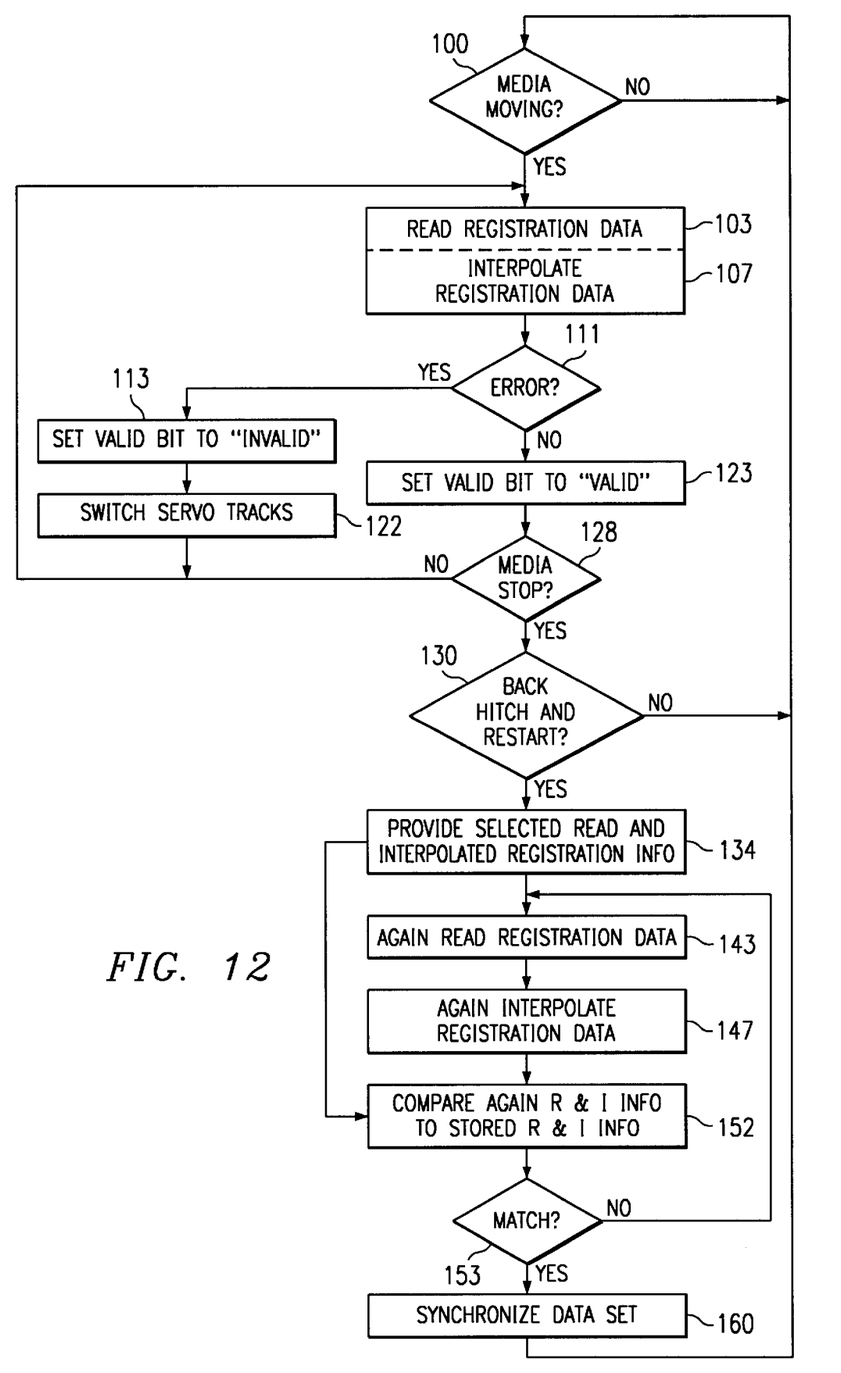
FIG. 12 is a flow chart depicting an embodiment of the method of the present invention.

FIG. 10 is a more detailed block diagram of an embodiment of a tape drive data storage device and registration and synchronization system of FIG. 3 for implementation with the one servo track of FIG. 2, FIG. 11 is a block diagram of an embodiment of error detection structure to be applied to the system of FIG. 10 for implementation with the two servo tracks of FIG. 9, and FIG. 12 is a flow chart depicting an embodiment of the method of the present invention.

Referring to FIGS. 10 and 12, step 100 tests whether the recording media (tape) is stopped or moving. If the media is stopped, "NO", the test is again conducted until the media is moved by the tape drive 12 at a sufficient rate of speed that the servo system 52 of the tape drive can read the servo data and the prerecorded longitudinal registration data, "YES" in step 100. The servo system 52 of tape drive 12 provides the servo data signals and the prerecorded data from the one, or one of, the servo tracks. The signal decoder 36 decodes the linear position registration data pattern, comprising, for example, a synchronization character, a linear position registration data word, and any other data. A detector 102 of the linear position (LPOS) generation logic, in step 103, detects the prerecorded linear position registration data from the decoded servo track pattern. As discussed above, a total linear position registration data word may require a length of tape longer than the desired resolution.

Therefore, an interpolator 106 of the linear position generation logic, in step 107, additionally interpolates the linear position registration data so as to provide greater resolution of the linear position of the recording media or tape.

Referring to FIGS. 11 and 12, in accordance with the present invention, the identical linear position registration data is prerecorded in each of duplicate servo tracks. The data signals from the two servo tracks are decoded by servo decoders 36 and 36', as discussed above, and one of the decoded signals is supplied by switch 114 to detector 102 and interpolator 106. Thus, should an error occur in one of the servo tracks, or should an error occur in reading one of the servo tracks, a registration and synchronization system will switch from the error servo track to the other servo track.

An error detector 110, in step 111, monitors the servo system 52 and the data of the servo track detected by detector 102. In monitoring the servo system 52, with examplary servo tracks comprising alternating groups of 4 and of 5 repeated pairs of transitions, the error detecting step 111 comprises detecting a missing or extra transition from the pairs of transitions. Additionally, or alternatively, while monitoring the detector 102, where the modulated prerecorded linear position registration data comprises a single bit of multibit longitudinal position data in each frame, the error detecting step 111 may comprise detecting misplaced transitions, comprising an undetected bit in one of the groups of pairs of transitions. Other implementations of the error detecting step 111 may be envisioned by those of skill in the art.

If an error is detected, "YES", the error detector 110, in step 113, provides a signal to logic 120 of FIG. 10 on line 121, and the logic 120 sets a "VALID" bit to "0", meaning "INVALID", as will be explained. In step 122, the signal from error detector 110 operates the switch 114, which may be located in the servo system 52, to switch channels from the signal decoder 36 or 36' having the error to the other signal decoder.

If no error is detected in step 111, "NO", the "VALID" bit is set to "1", meaning "VALID", in step 123, as will be explained.

The linear position generation logic detector and interpolator then continue to read and interpolate the linear position registration data, repeating steps 103, 107 and 111.

Referring to FIGS. 10 and 12, detector 102 and interpolator 106 continuously read and interpolate the linear position registration data modulated into the prerecorded servo pattern on the recording media, and supply the read and interpolated position information to logic 120. The logic 120 provides the position information, together with a "VALID/INVALID" bit, and additional information to be described hereinafter, to a data formatter 54 over the linear interface 56. As will be explained, preferably, the position information is updated at each increased count of interpolator 106.

As discussed above, the data formatter 54 employs the "Code Word Pair Header ID" for each data set from the data channel 55 and builds a table 57 of the most recent Code Word Pair Header ID's vs. LPOS. When a data set separator is detected, a new entry is made in the table 57, which, if the table is full, overwrites the oldest entry in the table. Alternatively, as discussed above, the table may be a FIFO, pushing the new entry on and the oldest off.

As the result, the precise location of the most recent data set is latched in the table 57, together with the locations of a number of preceding data sets. The number of data sets whose precise locations are latched is therefore dependent upon the capacity of the table.

Figure 15:
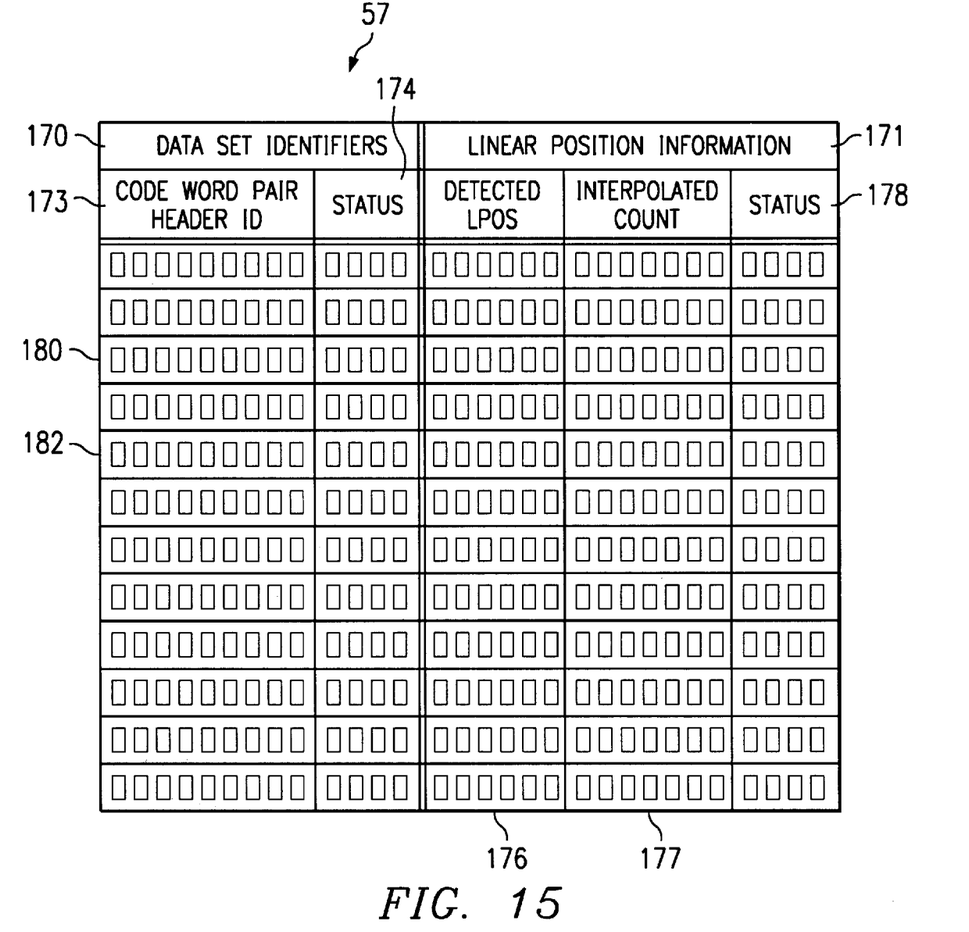
FIG. 15 is a representation of an embodiment of a table of data set to linear position registration information employed in the embodiment of the invention depicted in FIGS. 11 and 12.

FIG. 15 depicts an embodiment of a table 57 which relates identifiers of the data sets 170 to their interpolated linear position registration information 171. As discussed above, the data sets may be identified by a "Code Word Pair Header ID" in column 173 which uniquely identifies the "Code Word Pair" set to which it belongs. The term "Code Word Pair" relates to a subset of the data in the data set and its associated error correction ECC parity, which may be encoded into a pair of even/odd interleaved ECC code words. The Code Word Pair Header ID 173 includes an indicator of the "Write Pass" which is an ordinal count of the write pass in which this Code Word Pair was written. The data set identifier may also include status information in column 174 that may indicate whether the data set is a fragment, etc. Given this information, the tape controller can determine the correct location for a write append, whether it is after a fragment trailing a data set which is logically part of that data set or before a fragment which is actually a remnant of an old data set and does not contain any information of value.

The linear position information 171 includes, in column 176, the linear position registration data read from the prerecorded servo pattern and the interpolated position information in column 177. Additionally, status information may be included in column 178, which, for example, indicates the direction of the servo track, whether the servo data is valid, etc.

As discussed above, the linear position of a plurality of data sets may be latched in table 57. The tape controller may thus back hitch, restart, and begin the data transfer after the most recently latched data set, such as data set 180, or may instead begin the data transfer at one of the prior data sets, such as data set 182. Thus, the tape controller identifies the selected data set to the data formatter 54, which provides the read and interpolated linear position information from table 57 for the selected data set.

At some point, the recording media may be stopped, which is identified in step 128. If the continuous motion continues, "NO" in step 128, as indicated by drive 12 to logic 120, the process cycles back to steps 103 and 107. The stoppage may be due to an interruption in the data transfer or a temporary fault condition, as discussed above. Alternatively, the data transfer may be complete. Thus, the media, instead of restarting, may be rewound and removed from the drive 12.

If the data transfer was interrupted, the recording media must be back hitched and later restarted. Thus, if step 128 indicates that the continuous motion has stopped, "YES", logic 120, in step 130, determines whether the drive is conducting the back hitch and restart. If "NO", the drive must be stopped for another reason, such as for rewinding and unloading. The process thus cycles back to step 100.

If "YES", the drive will resume the read or write operation, and the present invention will allow the resumption to be at the correct data set by correlating and resynchronizing the media position with respect to the data set sequence. After the back hitch, the drive 12 accelerates the recording media up to the correct speed to allow the servo system to laterally align the tape head with respect to the data track.

The selected read and interpolated linear position registration information, derived from the LPOS to data set entries of table 57, is thus provided, in step 134, to the logic 120. As an example, the data formatter 54 provides the selected read and interpolated linear position registration information to a data channel system 55, which indicates the completion of the back hitch and restart process and provides the selected read and interpolated linear position registration information to the logic 120.

In addition, the interpolation count allows an unreadable LPOS to be identified, and the LPOS that should be at that location is substituted for the unreadable LPOS by extrapolation. For example, if the current LPOS is X(N), where X is the value read from the tape, the LPOS X(N)+1 is substituted upon reaching a full interpolation count if the tape is moving in the forward direction, or the LPOS X(N)−1 is substituted if the tape is moving in the reverse direction.

The detector 102 and interpolator 106 again, in steps 143 and 147, repeat steps 103 and 107 and read and interpolate the prerecorded linear position registration data.

Logic 120 provides the again read and interpolated linear position registration information to a comparator 150. The comparator, in step 152, compares the again read and interpolated linear position registration information to the provided read and interpolated linear position registration information. So long as there is no match, "NO" in step 153, the process cycles back to steps 143 and 147. Upon the provided and again read linear position registration information matching, in step 153, "YES", the identical linear position of the recording media for the selected data set has been reached, and the comparator 150 indicates a comparison match.

As one example of steps 134 and 152, during a write operation, the data channel system 55 reads the LPOS versus data set header table 57 of the data formatter 54 to determine the desired append point (in LPOS position) for a successive write operation when the write data stream is interrupted. When a following write operation is initiated and the back hitch conducted, the data channel system 55 issues a new locate request to the servo system 52, with the target LPOS parameter derived from the table 57. The servo system 52 writes this target LPOS value for the append point into the logic 120. The drive 12 restarts the tape and accelerates the tape to the recording velocity, and acquires the track following servo signal to establish the transverse positioning of the head. The servo system 52 determines when the servo parameters of velocity and track following position are within the control tolerances to enable the data set registration process. As an example, the servo head only needs to be over the servo band to read the LPOS. Then the comparator 150 conducts the comparison of the again read and interpolated linear position registration information to the provided read and interpolated linear position registration information.

Upon a match in step 153, the comparator provides the write enable signal on line 58 to the data formatter 54.

During a read operation, the process is similar to that of the write operation. However, in this case, the comparator 150 provides the read enable signal on line 59 to the data formatter 54. Additionally, the read enable signal can be issued significantly in advance of the target LPOS position, since the data formatter 54 is capable of identifying the target data set Code Word Header ID, and it can begin transferring data from the media to the data buffer. Thus, an earlier target LPOS position may be set in step 134.

Those of skill in the art can envision other methods of implementing step 134. The provided read enable signal on line 59 or write enable signal on line 58 may be deasserted when the end of a wrap is reached and the tape direction reversed, or when a servo error exceeds a write stop threshold.

As discussed above, the data formatter 54 then, in response to the comparison match indication, in step 160, initiates a read operation or a write append operation, synchronizing the reading and/or writing of data sets on the recording media. Once the synchronization has been acheived, the process cycles back to step 100.

Figure 13:
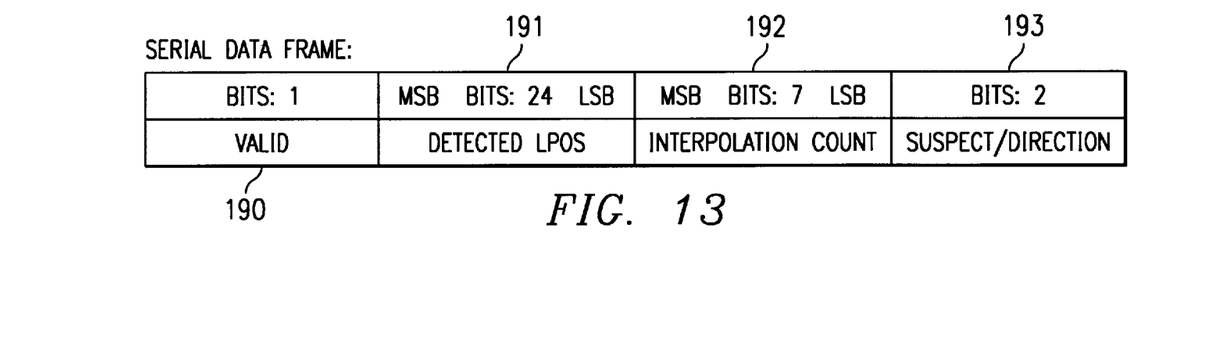
FIGS. 13 and 14 are respectively representations of serial data and timing of an embodiment of read and interpolated linear position registration information provided by the logic of FIG. 10.
Figure 14:
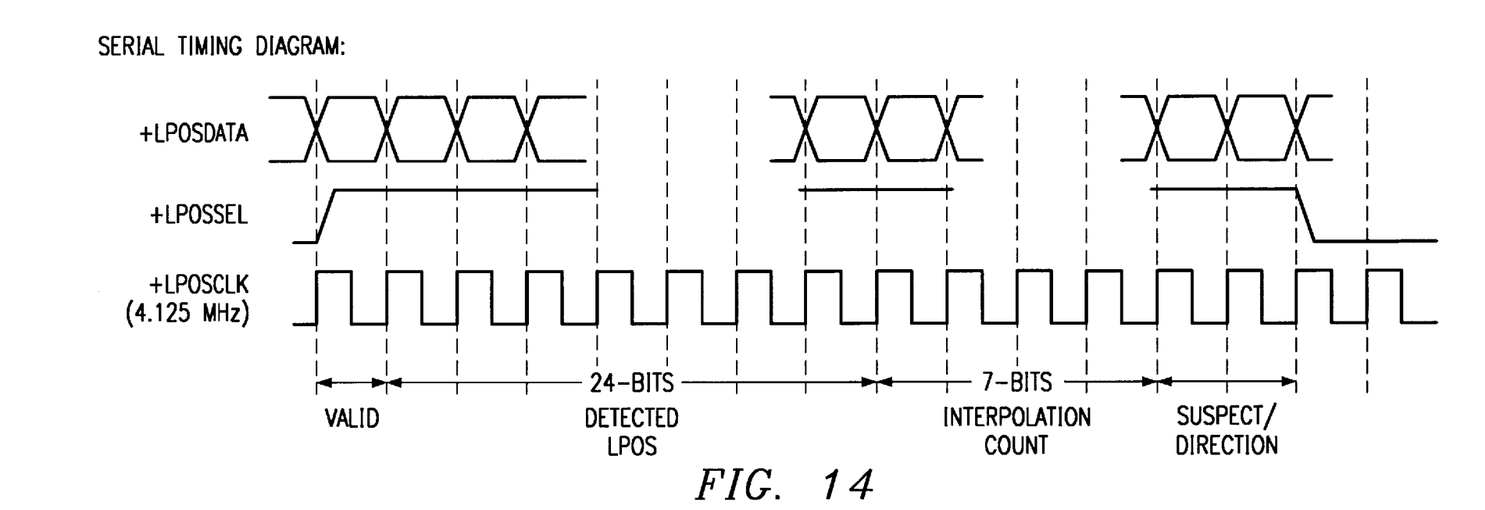

FIGS. 13 and 14 illustrate an example of the serial data and timing of the read and interpolated linear position registration information provided by the logic 120 of FIG. 10 on serial interface 56.

The first bit 190 is the "VALID" bit discussed above. The "VALID" bit indicates that the information transferred to the data formatter 54 represents an LPOS value plus an interpolation count that can be used. A "0" "VALID" bit therefore indicates that the information is "INVALID" and a "1" bit indicates the information is "VALID" as indicated in step 123 of FIG. 12. Next, the LPOS value read by the detector 102 is transmitted in word 191, and then the interpolation count is provided in word 192.

The read and interpolated linear position registration information is preferably updated and resent over serial interface 56 at each change in count of the interpolator. Alternatively, the LPOS is sent as read at each frame, and the interpolation clock sent at each half frame, which is counted at the data formatter 54 to give the interpolation count. Thus, the registration information provides a resolution equal to the interpolation distance. The interpolation may be reset to zero, for example, at the beginning of the synchronization character of the prerecorded linear position registration data, and will thus count through the synchronization character. To insure accuracy, the interpolation count may be preset to 8 upon reaching the end of the synchronization character and detecting the synchronization character. In the above example, the maximum interpolation count is 72.

The additional bits 193 may comprise a "SUSPECT" bit indicating the unsuccessful decoding of the linear position registration data by detector 102, without indicating an error, and a "DIRECTION" bit indicating the direction of the tape motion for a serpentine tape which is read both physically forward and physically backwards.

Those of skill in the art may envision other implementations of data communication to the data formatter 54.

Thus, the present invention provides the identification of the point on the recording media at which the data transfer ended, and registers and synchronizes the media and the data sets so as to resume the data transfer without requiring an incremental encoder.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for precisely registering and synchronizing data sets on a recording media, said recording media having a prerecorded servo pattern, which recording media is subject to continuing movement for reading and/or writing said data sets, interrupted by stopping at the end of a selected data set, back hitching and restarting, comprising the steps of:

during said continuing movement of said recording media while reading and/or writing data sets on said recording media, continuously reading and interpolating linear position registration data modulated into said prerecorded servo pattern on said recording media to provide read and interpolated linear position registration information for said data sets;

upon said stopping, back hitching and restarting said movement of said recording media, providing selected said read and interpolated linear position registration information;

again reading and interpolating said linear position registration data;

comparing said again read and interpolated linear position registration information to said provided read and interpolated linear position registration information, and indicating a comparison match; and synchronizing, in response to said comparison match indication, said reading and/or writing data sets on said recording media.

2. The method of claim 1, wherein said prerecorded linear position registration data is prerecorded on at least two parallel servo patterns, and wherein said continuously reading and interpolating step and said again reading and interpolating step are conducted with respect to one of said parallel servo patterns, and comprising the additional steps of:

detecting errors in said continuously reading and interpolating step with respect to said one parallel servo pattern; and upon detection of an error, switching said continuously reading and interpolating and said again reading and interpolating steps to another of said parallel servo patterns.

3. The method of claim 2, wherein said prerecorded servo patterns comprise frames of groups of repeated pairs of transitions, and wherein said error detecting step comprises identifying a missing or extra transition from said pairs of transitions.

4. The method of claim 2, wherein said servo patterns comprise frames of groups of repeated pairs of transitions, and said linear position registration data comprises a single bit of multibit longitudinal position data in each frame of said groups of repeated pairs of transitions, and wherein said error detecting step comprises identifying an undetected bit in one of said groups of repeated pairs of transitions.

5. The method of claim 1, wherein said servo patterns comprise frames of alternating groups of repeated pairs of transitions, and said linear position registration data comprises a single bit of multibit longitudinal position data in each frame of said groups of repeated pairs of transitions, and wherein said continuously reading and interpolating and said again reading and interpolating steps comprise reading said multibit longitudinal position data and counting each half frame said group of repeated pairs of transitions, beginning from the first bit of said longitudinal position data, to interpolate said linear position registration data.

6. The method of claim 1, wherein said servo patterns comprise frames of alternating groups of repeated pairs of transitions, wherein said linear position registration data comprises a synchronization character followed by longitudinal position data, each bit of said synchronization character and said longitudinal position data comprising a single bit in each frame of said repeated pairs of transitions, and wherein said continuously reading and interpolating and said again reading and interpolating steps comprise reading said synchronization character and said longitudinal position data and counting each half frame said group of repeated pairs of transitions, beginning from the first bit of said synchronization character, to interpolate said linear position registration data.

7. The method of claim 1, wherein said data sets are separated by data set separators, and wherein said synchronizing step comprises synchronizing said reading and/or writing at said data set separator immediately following the data set at said matched linear position registration data.

8. The method of claim 1, wherein said recording media comprises magnetic tape, and wherein said servo patterns comprise frames of alternating groups of 4 and of 5 repeated pairs of non-parallel magnetic transitions, each bit of said linear position registration data comprising at least one shifted pair of said repeated pairs of non-parallel magnetic transitions in one of said groups in each frame, and wherein said continuously reading and interpolating and said again reading and interpolating steps comprise reading said bits of said linear position registration data and counting each half frame group of said modulated prerecorded linear position registration data to interpolate said linear position registration data.

9. A data set registration and synchronization system for a longitudinal recording media having a prerecorded servo pattern, which recording media is mounted on a drive which subjects said recording media to continuing movement for reading and/or writing data sets on said recording media, interrupted by stopping at the end of a selected data set, back hitching and restarting said continuous movement of said recording media, said drive having a servo system for reading said prerecorded servo pattern on said recording media, comprising:

a detector coupled to said servo system for reading prerecorded linear position registration data modulated into said servo pattern on said recording media, during movement of said recording media;

an interpolator for interpolating said prerecorded linear position registration data, said detector and said interpolator providing linear position registration information for said data sets;

logic coupled to said drive, to said detector, and to said interpolator, responsive to said drive stopping, back hitching and restarting said continuing movement, for providing selected said read and interpolated said linear position registration information;

a comparator coupled to said detector, to said interpolator, and to said logic, responsive to said drive restarting said continuous movement of said recording media, for comparing said read and interpolated linear position registration information to said provided read and interpolated linear position registration information, and indicating a comparison match; and a data formatter coupled to said comparator, responsive to said comparison match indication, for synchronizing said reading and/or writing data sets on said recording media.

10. The system of claim 9, wherein said prerecorded linear position registration data is prerecorded on at least two parallel servo patterns, additionally comprising:

a switch coupled to said servo system and to said detector for providing said prerecorded linear position registration data from either one of said at least two parallel servo patterns to said detector, and for switching between said prerecorded linear position registration data from said at least two parallel servo patterns; and an error detector coupled to said servo system and to said switch for detecting errors in said provided prerecorded linear position registration data with respect to said one of said at least two parallel servo patterns, and upon detection of an error, operating said switch to switch to another of said at least two parallel servo patterns.

11. The system of claim 10, said prerecorded servo patterns comprise frames of groups of repeated pairs of transitions, and wherein said error detector identifies a missing or extra transition to detect said error.

12. The system of claim 10, wherein said servo patterns comprise frames of groups of repeated pairs of transitions, and said linear position registration data comprises a single bit of multibit longitudinal position data in each frame of said groups of repeated pairs of transitions, and wherein said error detector identifies an undetected bit in one of said groups of repeated pairs of transitions to detect said error.

13. The system of claim 9, wherein said servo patterns comprise frames of alternating groups of repeated pairs of transitions, and said linear position registration data comprises a single bit of multibit longitudinal position data in each frame of said groups of repeated pairs of transitions, and wherein said detector reads said multibit longitudinal position data, and said interpolator counts each half frame said group of repeated pairs of transitions, beginning from the first bit of said longitudinal position data, to interpolate said linear position registration data.

14. The system of claim 9, wherein said servo patterns comprise frames of alternating groups of repeated pairs of transitions, wherein said linear position registration data comprises a synchronization character followed by longitudinal position data, each bit of said synchronization character and said longitudinal position data comprising a single bit in each frame of said repeated pairs of transitions, and wherein said detector reads said synchronization character and said longitudinal position data, and said interpolator counts each half frame said group of repeated pairs of transitions, beginning from the first bit of said synchronization character, to interpolate said linear position registration data.

15. The system of claim 9, wherein said data sets are separated by data set separators, and wherein said data formatter synchronizes said reading and/or writing at said data set separator immediately following the data set at said matched linear position registration data.

16. The system of claim 9, wherein said recording media comprises magnetic tape, and wherein said servo patterns comprise frames of alternating groups of 4 and of 5 repeated pairs of non-parallel magnetic transitions, each bit of said linear position registration data comprising at least one shifted pair of said repeated pairs of non-parallel magnetic transitions in one of said groups in each frame, and wherein said detector reads said bits of said linear position registration data, and said interpolator counts each half frame group of said linear position registration data to interpolate said linear position registration data.

17. A magnetic tape media having prerecorded interpolatable linear position registration data information recorded in magnetic flux transition servo patterns defining at least one longitudinal servo track, comprising:
   a plurality of frames of alternating groups of burst patterns, each group having alternating numbers of at least two repeated pairs of non-parallel magnetic flux track following servo transitions, at least one of which transitions of each pair is continuously longitudinally variable across the width of said track, at least two of said transitions of said repeated pairs of a group in each frame shifted longitudinally with respect to other of said transitions of said repeated pairs, said shifted transitions comprising modulated linear position registration data, and each said group comprising interpolation information.

18. The magnetic tape media of claim 17, wherein said servo patterns comprise frames of alternating groups of 4 and of 5 repeated pairs of transitions, and said modulated linear position registration data shifted transitions in a group comprises a single bit of multibit longitudinal position data in each of said frames of said groups of repeated pairs of transitions.

19. The magnetic tape media of claim 17, comprising two longitudinal servo tracks, each comprising recorded magnetic flux transition servo patterns having identical said alternating groups of repeated pairs of transitions having identical said modulated linear position registration data, and identical said interpolation information.

20. The magnetic tape media of claim 17, wherein said modulated linear position registration data information additionally comprises a synchronization character followed by longitudinal position data.

21. The magnetic tape media of claim 20, wherein said longitudinal position data comprises non-repeating sequential information for the entire length of said magnetic tape media.

22. The magnetic tape media of claim 17, wherein each said frame of said alternative groups of burst patterns comprises said interpolation information.

* * * * *